United States Patent
Gagliano et al.

(10) Patent No.: US 9,811,505 B2
(45) Date of Patent: Nov. 7, 2017

(54) TECHNIQUES TO PROVIDE PROCESSING ENHANCEMENTS FOR A TEXT EDITOR IN A COMPUTING ENVIRONMENT

(71) Applicant: SAS Institute Inc., Cary, NC (US)

(72) Inventors: Tammy Gagliano, Holly Springs, NC (US); Yifei Li, Morrisville, NC (US); Bin Zhou, Beijing (CN); Bo Wang, Beijing (CN); Wei Wu, Beijing (CN)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/073,998

(22) Filed: Mar. 18, 2016

(65) Prior Publication Data

US 2017/0024359 A1    Jan. 26, 2017

Related U.S. Application Data

(60) Provisional application No. 62/194,530, filed on Jul. 20, 2015.

(51) Int. Cl.
| | |
|---|---|
| *G06F 17/00* | (2006.01) |
| *G06F 17/21* | (2006.01) |
| *G06F 3/0484* | (2013.01) |
| *G06F 17/22* | (2006.01) |

(52) U.S. Cl.
CPC .......... *G06F 17/211* (2013.01); *G06F 3/0484* (2013.01); *G06F 17/218* (2013.01); *G06F 17/2247* (2013.01); *G06F 17/2288* (2013.01)

(58) Field of Classification Search
CPC .................................................. G06F 17/211
See application file for complete search history.

(56) References Cited

U.S. PATENT DOCUMENTS

| | | | | |
|---|---|---|---|---|
| 5,680,478 A | * | 10/1997 | Wang | G06K 9/00456 382/171 |
| 5,701,500 A | * | 12/1997 | Ikeo | G06T 11/00 382/180 |

(Continued)

FOREIGN PATENT DOCUMENTS

| | | |
|---|---|---|
| EP | 1868084 | 12/2007 |
| WO | 2014039583 | 3/2014 |

OTHER PUBLICATIONS

Patwardhan et al., "Labeling by Landscaping: Classifying Tokens in Context by Pruning and Decorating Trees" CIKM'12, Oct. 29-Nov. 2, 2012, Maui, HI, USA, Copyright 2012 ACM, p. 1133-1142.*

(Continued)

*Primary Examiner* — Amelia Tapp

(57) ABSTRACT

Various embodiments include a system having interfaces, storage devices, memory, and processing circuitry. The system may include logic to render a portion of a first layer and a portion of a second layer for presentation, determine parameters of tokens for the second layer based a result of the rendering of the second layer, the parameters to include at least one of token width values, token offset values, line height values, and line top values. The system also to align the first layer and the second layer based on the parameters of the tokens for the second layer, and present the first layer and the second layer on a display, the first layer to present tokens and the second layer to receive events.

30 Claims, 16 Drawing Sheets

(56) References Cited

U.S. PATENT DOCUMENTS

| | | | | |
|---|---|---|---|---|
| 6,275,301 | B1* | 8/2001 | Bobrow | G06K 15/02 |
| | | | | 358/1.1 |
| 8,266,524 | B2* | 9/2012 | Bailey | G06F 17/30893 |
| | | | | 715/234 |
| 8,588,528 | B2* | 11/2013 | Chapman | G06K 9/033 |
| | | | | 382/167 |
| 8,823,735 | B2* | 9/2014 | Tanaka | G06Q 10/101 |
| | | | | 345/441 |
| 8,892,992 | B2* | 11/2014 | Mansfield | G06F 17/211 |
| | | | | 715/234 |
| 9,026,900 | B1* | 5/2015 | Pugh | G06F 17/24 |
| | | | | 715/227 |
| 9,063,911 | B2* | 6/2015 | Levy | G06F 17/211 |
| 9,292,150 | B2* | 3/2016 | Engel | G09G 3/36 |
| 2014/0013437 | A1* | 1/2014 | Anderson | G06F 21/84 |
| | | | | 726/26 |
| 2014/0053057 | A1* | 2/2014 | Reshadi | G06F 17/2247 |
| | | | | 715/234 |

OTHER PUBLICATIONS

Sandler et al., "Sonic visualiser: an open source application for viewing, analysing, and annotating music audio files", Proc ACM Int Conf Multimed, Jan. 2010, 3 pages.

HotKeyz Download, "Work faster and more efficiently by using your keyboard instead of your mouse", retrieved from <http://softpedia.com/get/Tweak/System-Tweak/HotKeyz.shtml>, Nov. 2011, 2 pages (author unknown).

"Fast scriptable desktop automation with hotkeys Creating your own apps and macros has never been easier", AutoHotkey: macro and automation Windows scripting language, retrieved Sep. 28, 2015 from <http://ahkscript.org/docs/Tutorial.htm>, 2 pages (author unknown).

* cited by examiner

US 9,811,505 B2

TECHNIQUES TO PROVIDE PROCESSING ENHANCEMENTS FOR A TEXT EDITOR IN A COMPUTING ENVIRONMENT

RELATED APPLICATION

This application claims the benefit of priority of 35 U.S.C. §119(e) to U.S. Provisional Patent Application Ser. No. 62/194,530, filed on Jul. 20, 2015, which is incorporated by reference in its entirety.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

An apparatus includes processing circuitry and logic, at least partially implemented by the processing circuitry. Further, the apparatus including the logic may render a portion of a first layer and a portion of a second layer for presentation. The logic may also determine parameters of tokens for the second layer based on a result of rendering the second layer, the parameters to include at least one of token width values, token offset values, line height values, and line top values and align the first layer and the second layer based on the parameters for the tokens for the second layer. In some embodiments, the logic may also present the first layer and the second layer on a display, the first layer to present tokens and the second layer to receive events.

Embodiments may also include a computer-implemented method. The computer-implemented method may include rendering a portion of a first layer and a portion of a second layer for presentation, and determining parameters of tokens for the second layer based on a result of rendering the second layer, the parameters to include at least one of token width values, token offset values, line height values, and line top values. In some embodiments, the computer-implemented method also include aligning the first layer and the second layer based on the parameters for the tokens for the second layer and presenting the first layer and the second layer on a display, the first layer to present tokens and the second layer to receive events.

Embodiments may also include at least one non-transitory computer-readable storage medium including instructions that when executed cause processing circuitry to render a portion of a first layer and a portion of a second layer for presentation. The computer-readable storage medium may include instructions that when executed cause processing circuitry to determine parameters of tokens for the second layer based on a result of rendering the second layer, the parameters to include at least one of token width values, token offset values, line height values, and line top values, align the first layer and the second layer based on the parameters for the tokens for the second layer, and present the first layer and the second layer on a display, the first layer to present tokens and the second layer to receive events.

BRIEF DESCRIPTION OF THE DRAWINGS

Embodiments of this disclosure are illustrated by way of example and not by way of limitation, in the figures of the accompanying drawings in which like reference numerals refer to similar elements.

DETAILED DESCRIPTION

Figure 1A:
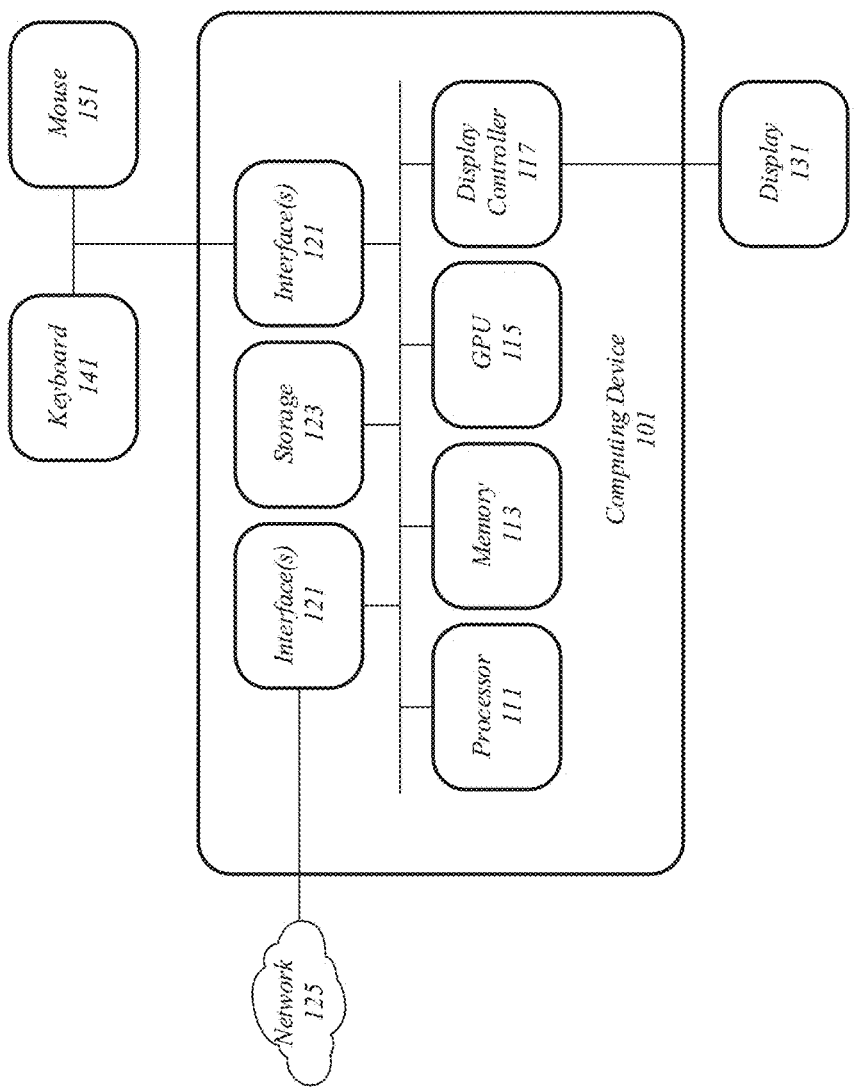
FIG. 1A illustrates an example embodiment of a compute system.

Various embodiments are directed to methods, apparatuses, devices, systems, and so forth to provide text editor features. Some embodiments are directed to providing the text editor features in a web browser based environment. The text editor features may include enabling a user to enter and edit computer code in the web browser based environment, for example. Further, embodiments include providing number of features to help assist users to write text and code more efficiently and easily. These features may include supporting multiple languages' syntax highlighting, code folding, a focus line feature, block marks, search results, a cursor, a block selection, a focus line bar, auto completion, and so forth. Embodiments may also provide features to assist users with disabilities. These accessibility features include screen reader functionality, a zooming feature or window magnifier, a theme manager, a shortcut manager, and so on. Embodiments are not limited in this manner.

Some embodiments may include a text editor system include circuitry and one or more components to provide the text editor capabilities. As will be discussed in more detail below, the text editor system may utilize a multi-layer approach to provide the text editor features. These layers may include the event receiving layer to receive one or more events and the effects layer to present one or more tokens and effects. Each of the layers may also include one or more sub-layers (nodes) to assist in processing for the text editor system and the layers. In embodiments, these layers may be visible or transparent to a user of the text editor system. Further, embodiments include techniques to control synchronization between these layers of the text editor system including the event receiving layer and the effects layer.

Moreover, embodiments include utilizing the components and the nodes of the text editor system to provide processing enhancements for controlling the synchronization between the layers. These processing enhancements include determining parameters for tokens, e.g. input symbols, based on rendering one or more of the layers, caching one or more of the parameters as cached values and for later use when presenting the layers, rendering only a portion of one or more layers within a viewable area, and performing incremental calculations when determining the parameters. Embodiments may include processing enhancements to determine received events and event sequences including utilizing pattern recognition and one or more pattern tables. Embodiments may also include a transaction mechanism to process the received events and event sequences. These features will be discussed in more detail below.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure or routine is referred to here and is generally conceived to be a self-consistent sequence of operations leading to a desired result. These operations are those requiring physical manipulations of physical quantities. Usually, though not necessarily, these quantities take the form of electrical, magnetic or optical transmissions capable of being stored, transferred, combined, compared and otherwise manipulated. It proves convenient at times, principally for reasons of common usage, to refer to these transmissions as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations or routines described herein that form part of one or more embodiments. Rather, the operations are machine operations.

FIG. 1A illustrates a general overview of a system 100 for processing information and providing a text or code editor. FIG. 1A illustrates an example of system 100 including a number components such as a computing device 101 coupled with a network 125, a display 131, a keyboard 141, and a mouse 151. Further, the computing device 101 includes a number of components such as a processor 111, a memory 113, a graphics processing unit (GPU) 115, a display controller 117, one or more interfaces 121, and storage 123.

In embodiments, the processor 111 which may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In various embodiments, computing device 101 may include more than one processor.

In some embodiments, the memory 113 may be coupled with the processor 111 via an interconnect, or by a dedicated communications bus between processor 111 and memory 113, which may vary as desired for a given implementation. Memory 113 may be implemented using any machine-readable or computer-readable media capable of storing data, including both volatile and non-volatile memory. In some embodiments, the machine-readable or computer-readable medium may include a non-transitory computer-readable storage medium, for example. The embodiments are not limited in this context.

The memory 113 may store data momentarily, temporarily, or permanently. The memory 113 may store instructions and data for computing device 101, such as those discussed herein. The memory 113 may also store temporary variables or other intermediate information while the processor 111 is executing instructions. The memory 113 is not limited to storing the above discussed data; the memory 113 may store any type of data.

In some embodiments, the computing device 101 includes a GPU 115 which may be dedicated circuitry designed to accelerate the processing and creation of one or more images for presentation on a display. In some embodiments, the GPU 115 utilizes memory, such as memory 113 or may have dedicated memory, to accelerate the creation of the images in a frame buffer intended for output to a display. In some embodiments, the GPU 115 may enable processing of images and large blocks of visual data in a parallel manner. In some embodiments, the GPU 115 may process information and data associated with presenting and processing a text editor, such as one or more of the text editors discussed herein. However, embodiments are not limited in this manner.

In some embodiments, the computing device 101 may also include a display controller 117 or a display processor which may include a video transmission generator to produce display transmissions for presentation on display 131, for example. The display controller 117 may also generate an audio transmission, but that is not their main function. The display controller 117 may generate the timing of video transmissions such as the horizontal and vertical synchronization transmissions and the blanking interval transmission. In some embodiments, the display controller 117 may be implemented as part of and on the same circuitry die as the GPU 115 and/or the processor 111. The display controller 117 may work with the GPU 115 to present information on the display 131. For example, the display controller 117 may receive one or more frames including information for presentation on the display 131. In some embodiments the display controller 117 can support any number of interfaces and interface types, such as a video graphics array (VGA), digital video interface (DVI), High-Definition Multimedia Interface (HDMI), DisplayPort, very-high-density cable interconnect (VHDCI), and so forth. For example, the display controller 117 may produce a VGA-transmission for communication and transporting over a cable to the display 131. Embodiments are not limited to this example.

The computing device 101 also includes one or more interfaces 121 which may enable the system to communicate over a network environment 125. In some embodiments, the interfaces 121 can be a wired or wireless network interfaces. In some embodiments, one or more of the interfaces may be a universal serial bus interface (USB), a Firewire interface, a Small Computer System Interface (SCSI), a parallel port interface, a serial port interface, or any other device to enable the computing device 101 to exchange information. For example, the interfaces may be coupled with a keyboard 141 and mouse 151 and capable of receiving input transmissions from these devices. The interfaces 121 may also communicate information to the keyboard 141 and/or mouse 151, such as configuration transmissions, feedback information, audio information, video information, and so forth.

The computing device 101 may also include storage 123 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 123 may include technology to increase the storage performance enhanced protection for valuable digital media when multiple hard drives are included, for example. Embodiments are not limited in this manner.

Figure 1B:
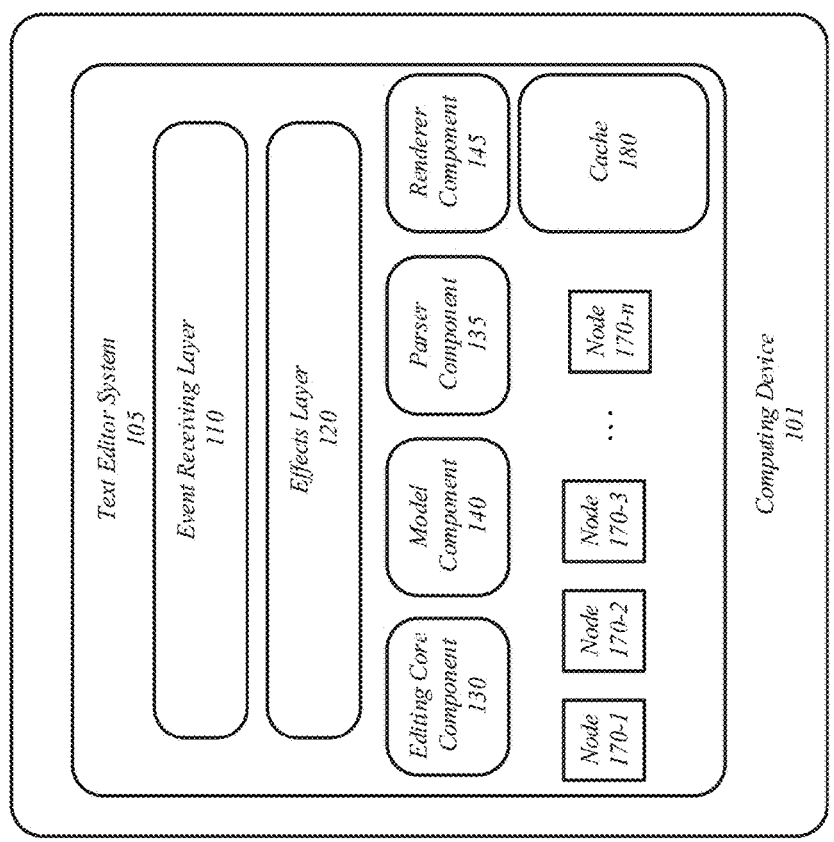
FIG. 1B illustrates an example embodiments of a compute system including a text editor system.

FIG. 1B illustrates an example embodiment of a computing system 150 including a computing device 101, which may be the same as the computing device discussed above in FIG. 1A. The computing system 150 may include the computing device 101 having a number of components including a text editor system 105 to process information and data for a text editor. In embodiments, the text editor system 105 may be implemented in a markup language, such as the Hyper Text Markup Language (HTML) or extensible markup language (XML) utilizing a document object model (DOM) tree having one or more DOMs. The text editor system 105 may include one or more layers to present to a user including an event receiving layer 110 and an effects layer 120. The text editor system 105 also includes an editing core component 130, a model component 140, a parser component 135, a renderer component 145 and one or more nodes **170-*n*, where n may be any positive integer. Each of the components and nodes may also be implemented in a markup language as a DOM node in a DOM tree. The text editor system 105 also includes a cache 180** which may store one or more cached values of parameters as will be discussed in more detail below.

The text editor system 105 may be any type of text editor or code editor that enables a user to enter text, symbols, alphanumerical characters, and so forth in any number of languages. In some embodiments, the text editor system 105 may be implemented as part of an online code editor system accessible via a web browser such as Firefox®, Chrome®, Safari®, Internet Explorer®, and so forth. For example, the one or more components of the text editor system 105 may be presented to a user on a display in a web browser. To this extent, the text editor system 105 may be implemented across one or more networks such that backend processing conducted by one or more components may occur on one or more servers (local or remote) and presented to a user on a display of a terminal or computing device. Embodiments are not limited in this manner and in some instances the text editor system 105 may be implemented on a single computing device.

The text editor system 105 may provide a number of features to help assist users to write text and code more efficiently and easily. These features may include supporting multiple languages' syntax highlighting, code folding, a focus line feature, block marks, search results, a cursor, a block selection, a focus line bar, auto completion, and so forth. The text editor system 105 may also provide features to assist users with disabilities. These accessibility features include screen reader functionality, a zooming feature or window magnifier, a theme manager, a shortcut manager, and so on. Embodiments are not limited in this manner.

As will be discussed in more detail below, the text editor system 105 may utilize a multi-layer approach to provide the previously discussed features. These layers may include the event receiving layer 110 and the effects layer 120. Each of the layers may also include one or more sub-layers (nodes) to assist in processing for the text editor system 105 and the layers. In embodiments, these layers may be visible or transparent to a user of the text editor system 105. Further, embodiments include techniques to control synchronization between these layers of the text editor system 105 including the event receiving layer 110 and the effects layer 120.

Moreover, embodiments include utilizing the components and the nodes of the text editor system 105 to provide processing enhancements for controlling the synchronization between the event receiving layer 110 and the effects layer 120. These processing enhancements include determining parameters for tokens, e.g. input symbols, based on rendering one or more of the layers, caching one or more of the parameters for later use when presenting the layers, rendering only a portion of one or more layers within a viewable area, and performing incremental calculations when determining the parameters. Embodiments may include processing enhancements to determine received events and event sequences including utilizing pattern recognition and one or more pattern tables. Embodiments may also include a transaction mechanism to process the received events and event sequences.

As previously mentioned, the event receiving layer 110 may be an XML DOM node and may be capable of receiving an event sequence having one or more events that may be processed by the text editor system 105. These events include mouse movements, button presses such as button down, button up, key down, and key up. The events be captured by the event receiving layer 110 and enable a user to enter one or more tokens including one or more symbols, characters, numbers, letters, and so forth. The event receiving layer 110 may receive events or user interactions and communicate them to other components of the text editor system 105 for processing to enable the advanced code editing features, for example.

In some embodiments, the event receiving layer 110 may utilize textarea implemented using the textarea tag. Textarea is a HTML5 element that represents a multi-line plain-text edit control to enable entry of text. Further, the event receiving layer 110 may be transparent such that it may not be visually presented to a user. For example, a transparency setting for textarea may be set to a very small value, such as 0.005. Embodiments are not limited to this example and the transparency setting may be set to any value such that the event receiving layer 110 is not visible to a user. A user may be interacting with the event receiving layer 110 by inputting events and so forth, but may not be aware of it because the layer is transparent to the user. The event receiving layer 110 may enable and provide other features including a screen reader feature to provide audio feedback to a user and a windows magnifying feature to provide information in a larger readable format. For example, the event receive layer 110 may be capable of causing audio output to be communicated to a user via speaker (not shown) to present information in an audio format when the screen reader feature is enabled. In another example, the event receiving layer 110 may cause a magnifying effect on the effects layer 120 for text selected, highlighted, or emphasized by the user when the windows magnifying feature is enabled. Embodiments are not limited to these examples. The event receiving layer 110 is now discussed in more detail below with reference to FIG. 2A.

Figure 2A:
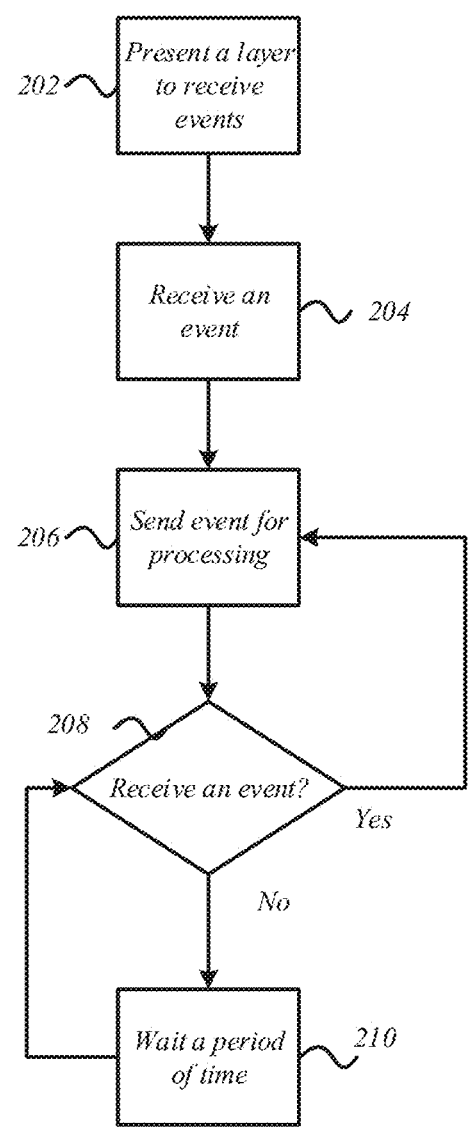
FIG. 2A illustrates an example embodiment of a first logic flow for processing by a text editor system.

FIG. 2A illustrates one possible logic flow 200 that may occur while processing information and events by the event receiving layer 110. Embodiments are not limited to this manner. Reference is now made to FIG. 2A. At block 202, the events receiving layer 110, is presented to a user on a display to receive events. The event receiving layer 110 may be presented as part of a text editor system 105 in a web browser, for example. As previously mentioned, the event receiving layer 110 may be presented in a transparent manner such that a user does not actually see the event receiving layer 110, but is able to interact with it. For example and at block 204, the event receiving layer 110 may receive an event. As mentioned, the event may be a mouse input, a button input, a keyboard input, and so forth. In some embodiments, the event may be received as a verbal commend via a microphone (not illustrated). Embodiments are not limited in this manner. Further and a block 206, the event receiving layer 110 may communicate the event to one or more other components of the text editor system 105 for further processing. For example, the event receiving layer 110 may send the event to the editing core component 130 which is capable of handling one or more events in an event sequence and implementing a transaction mechanism to process the events, as will be discussed in more detail below.

In embodiments, the event receiving layer 110 may continue to receiving events and at decision block 208, a determination may be made as to whether an additional event has been received. If an event has been received at block 208, the event may be communicated to one or more other components at block 206, as previously discussed above. If an event has not been received at block 208, the event receiving layer 112 may wait for period of time and the process may repeat until text editing ceases. The period of time may be any period of time, such as 1 millisecond (ms). Embodiments are not limited in this manner and to a specific period of time.

Although FIG. 2A illustrates certain blocks occurring in a particular order, various embodiments are not limited in this manner. For example, one or more blocks may occur in parallel or simultaneously. In another example, one or more blocks may occur before or after other blocks and may be in a different order. In addition, the blocks are not dependent upon one another. Further, although FIG. 2A is discussed with reference to the event receiving layer 110, embodiments are not limited in this manner and one or more operations may be performed by other components and circuitry of the text editor system 105.

With reference back to FIG. 1B, the text editor system 105 includes the effects layer 120 which may also be implemented as an XML DOM node to present one or more tokens on a display and to enable one or more features and effects such as syntax highlighting, code folding, a focus line feature, block marks, search results, a cursor, a block selection, a focus line bar, auto completion, and so forth. The effects layer 120 is the visible layer that is presented to a user on a display of the text editor system 105. In some embodiments, the effects layer 120 may be presented in a viewable area of a web-browser, for example. The effects layer 120 may also include a number of sub-layers. For example, each feature or effect may be implemented by a dedicated sub-layer or node. For example, syntax highlighting, code folding, a focus line feature, block marks, search results, a cursor, a block selection, a focus line bar, auto completion, and so forth may be represented and processed by a separate sub-layer or node to enable these features.

Figure 2B:
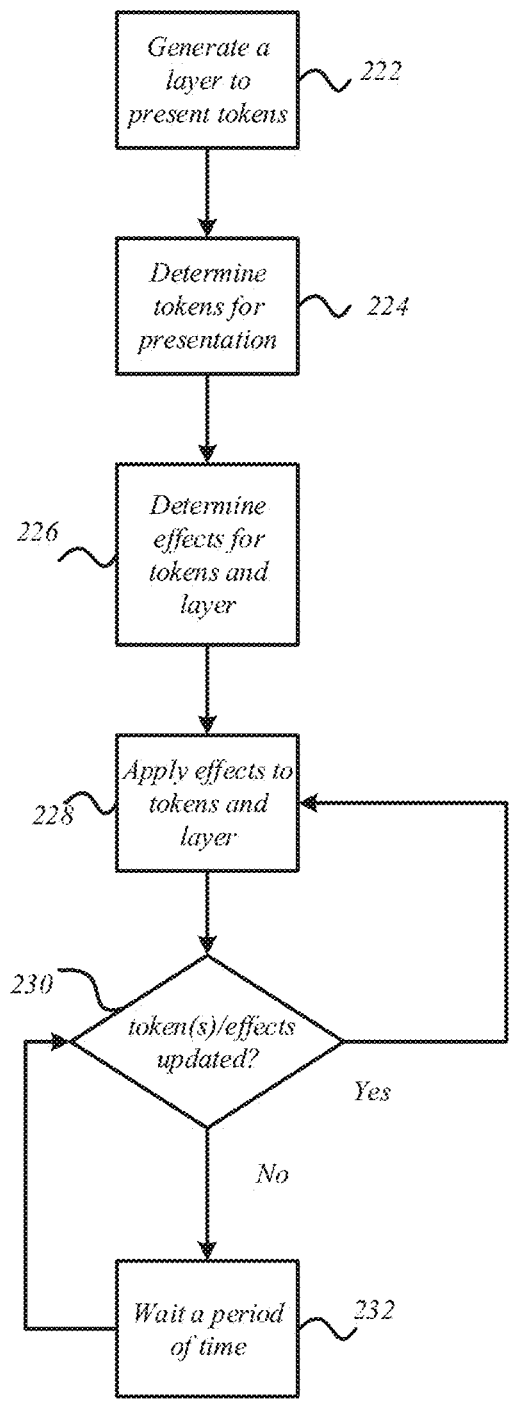
FIG. 2B illustrates an example embodiment of a second logic flow for processing by a text editor system.

FIG. 2B illustrates one possible logic flow 220 that may occur while processing information and tokens by the effects layer 120. Reference is now made to FIG. 2B. At block 222, the text editor system 105, and in particular, the effects layer 120 may be presented on a display to present one or more tokens and enable one or more effects. As previously mentioned, the effects layer 120 may be the visible layer capable of presenting text or code and the effects applied to the text or code on a display for a user. In one example, the effects layer 120 may be presented in a web browser to enable editing of code. Embodiments are not limited to this example.

At block 224, the effects layer 120 may determine one or more tokens for presentation on a display. Each token may represent an alphanumeric character, symbol, a break, a tab, a special character, a non-break space, mathematical symbol, any other character or symbol in any language, and so forth. The tokens for presentation may be determined based on one or more events received by the event receiving layer 110 and processed by the components and nodes of the text editor system 105. For example, the tokens may be received from the components of the text editor system 105, such as the editing core component 130.

In some embodiments, the effects layer 120 may determine one or more effects to apply to the tokens and/or the presentation of the tokens at block 226. The effects may include syntax highlighting, code folding, a focus line feature, block marks, search results, a cursor, a block selection, a focus line bar, auto completion, and so forth. In one example, the effects layer 120 may determine the one or more effects to apply based on one or more user setting(s). More specifically, a user may enable or disable any of the one or more above discussed effects via a graphical user interface (GUI). However, embodiments are not limited in this manner and the effects to apply may be based on one or more default setting(s), for example. Further, and at block 228, the effects layer 120 may apply the one or more effects to the token(s) and the layer for presentation on display.

At decision block 230, the effects layer 120 may determine whether one or more tokens and/or effects have been updated. This may include receiving any additional tokens, receiving any changes to previously presented tokens, receiving any changes to settings for one or more effects, and so forth. If tokens and/or effects have changed at block 230, the effects layer 120 may apply the changes appropriately at block 228. However, if no changes have been detected, the effects layer 120 may wait for a period of time at block 232 and the repeat the determination. This process may continue until text/code editing ceases.

Although FIG. 2B illustrates certain blocks occurring in a particular order, various embodiments are not limited in this manner. For example, one or more blocks may occur in parallel or simultaneously. In another example, one or more blocks may occur before or after other blocks and may be in a different order. In addition, the blocks are not dependent upon one another. Further, although FIG. 2B is discussed with reference to the effects layer 120, embodiments are not limited in this manner and one or more operations may be performed by other components and circuitry of the text editor system 105.

With reference back to FIG. 1B, the text editor system 105 also includes an editing core component 130 which may handle one or more events received by the event receiving layer 110 including performing pattern recognition and transaction processing. The editing core component 130 may also provide advanced editing functions by processing the received events and synchronizing the information between the event receiving layer 110 and the one or more other components of the text editor system 105 including the model component 140.

Figure 2C:
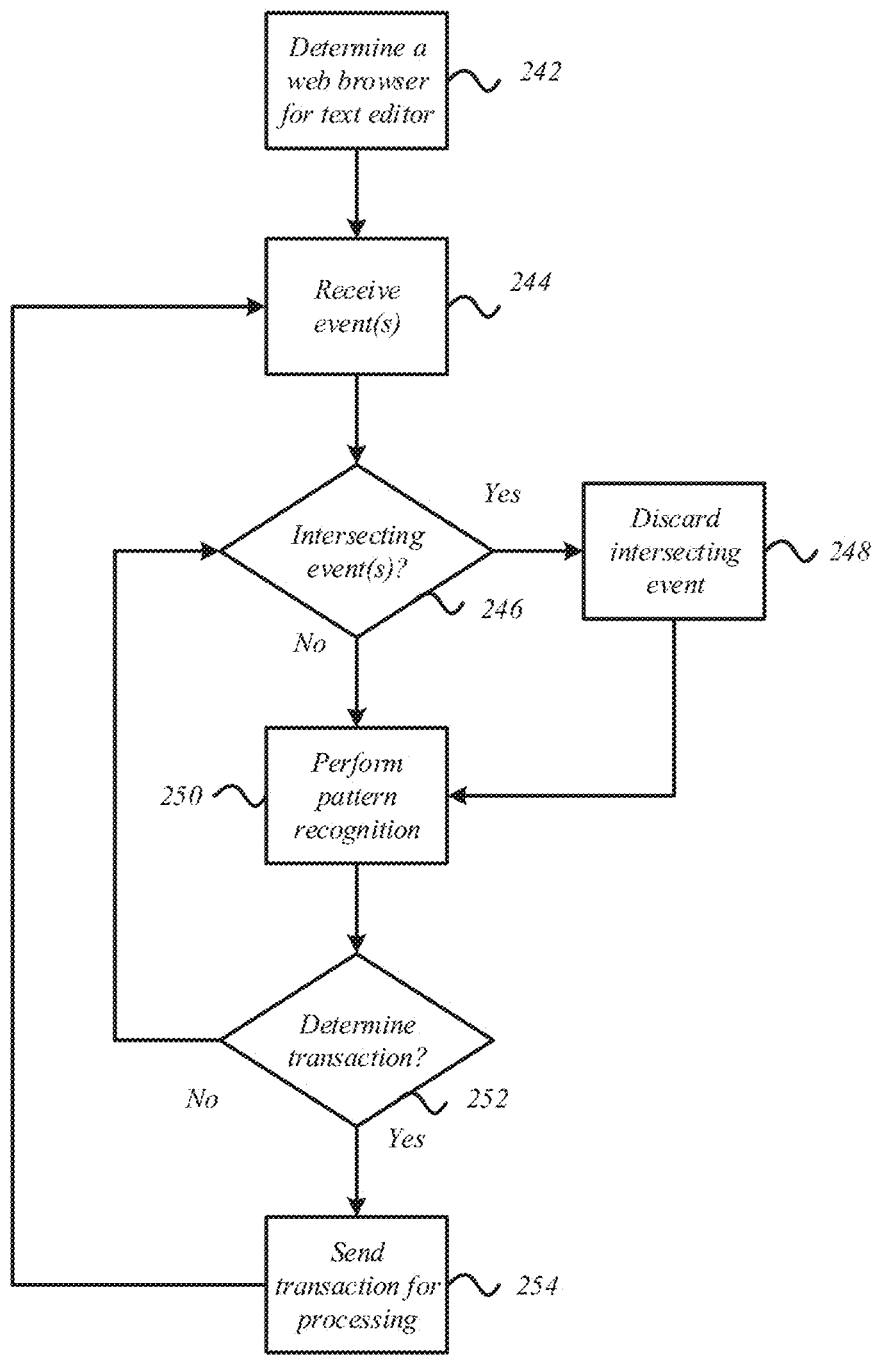
FIG. 2C illustrates an example embodiment of a third logic flow for processing by a text editor system.

FIG. 2C illustrates one possible logic flow 240 that may occur while processing information and received events by the editing core component 130. Reference is now made to FIG. 2C. At block 242, the editing core component 130 determines which web browser is being used to present the text editor system. More specifically, the editing core component 130 may communicate a query to the web browser requesting information to determine the type and version of a particular web browser being used by a user. Other information may be obtained from the web browser. The web browser may return a response providing the information, the response may include metadata having information about the web browser, for example. Embodiments are not limited to this example and other techniques known to those skilled in art may be used to determine information for a web browser. As will be discussed in more detail below, the web browser information may be used for pattern recognition for an event sequence. For example, different browsers may provide different event sequences for the same transaction and the editing core component 130 may determine the transaction based on the web browser information.

At block 244, the editing core component 130 may receive one or more events from the event receiving layer 110. The one or more events may be received as an event sequence and include a mouse input, a button input, a keyboard input, and so forth. Further and at block 246, the editing core component 130 may determine whether an event sequence includes any intersecting events. The intersecting event may be discarded at block 248. An intersecting event may be any unexpected event or event that does not belong in an event sequence. For example, an event sequence may include one or more keyboard input events and a mouse input event. The mouse input event may be detected as an intersecting event since it does not conform to the pattern of a series of keyboard input events. In another example, an errant keyboard input event may also be detected. More specifically, the editing core component 130 may determine an errant keyboard input event based on known event sequences. The received event sequence may be compared to known event sequences and if there is not a match, the editing core component 130 may search through the received event sequence to determine which event does not belong in the event sequence. Embodiments are not limited to these examples. In some instances, the intersecting event may be determined during the pattern recognition operation, at block 250, as will be discussed below.

At block 250, the editing core component 130 may perform a pattern recognition to determine a transaction for an event sequence. A transaction may include one or more tokens which each may be an alphanumeric character, symbol, a break, a tab, a special character, a non-break space, mathematical symbol, any other character or symbol in any language, and so forth. The pattern recognition determination may be performed by comparing the event sequence to one or more patterns stored in memory, such as memory 113. The one or more patterns maybe stored in a pattern recognition table, pattern recognition list, database, or any other data structure. In some instances, the one or more patterns may be stored as hash values in memory. In this example, the editing core component 130 may determine a hash value for the received event sequence and compare the generated hash value to one or more hash values stored in the memory. The transaction may be based on matching hash values.

More specifically, a transaction may be determined based on the generated hash value matching a particular hash value associated with the transaction stored in the memory at block 252. If the generated hash value does not match a stored hash value, the editing core component 130 may determine that the event sequence includes an intersecting event. In this case, the editing core component 130 may find and remove the intersecting event sequence, as discussed above at blocks 246 and 248. At block 254, the editing core component 130 may send the transaction to one or more other components of the text editor system 105 at block 254.

Although FIG. 2C illustrates certain blocks occurring in a particular order, various embodiments are not limited in this manner. For example, one or more blocks may occur in parallel or simultaneously. In another example, one or more blocks may occur before or after other blocks and may be in a different order. In addition, the blocks are not dependent upon one another. Further, although FIG. 2C is discussed with reference to the editing core component 130, embodiments are not limited in this manner and one or more operations may be performed by other components and circuitry of the text editor system 105.

Figure 2D:
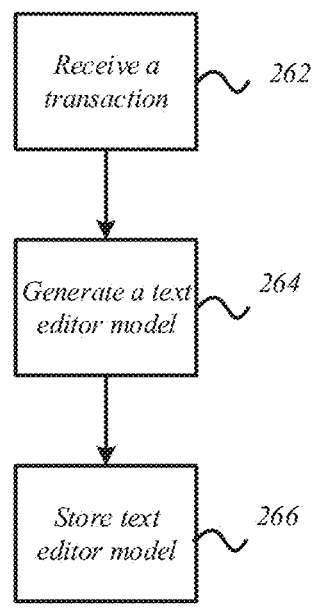
FIG. 2D illustrates an example embodiment of a fourth logic flow for processing by a text editor system.

With reference back to FIG. 1B, the text editor system 105 also includes a model component 140 which may store the entire or whole text/code document or file. FIG. 2D illustrates one possible logic flow 270 that may occur while processing information by the model component 140. Reference is now made to FIG. 2D. At block 262, the model component 140 may receive a transaction from the editing core component 130. The transaction may include one or more tokens for presentation on a display by the text editor system 105. At block 264, the model component 140 may generate a text editor model that may include configuration settings, layout settings, effect setting, feature settings, and so forth. These settings may be used during presentation of the tokens. Moreover, the model may also include the one or more tokens for presentation. At block 266, the model component 140 may store the text editor model in memory, such as memory 113, or storage, such as storage 123. Embodiments are not limited in this manner.

Although FIG. 2D illustrates certain blocks occurring in a particular order, various embodiments are not limited in this manner. For example, one or more blocks may occur in parallel or simultaneously. In another example, one or more blocks may occur before or after other blocks and may be in a different order. In addition, the blocks are not dependent upon one another. Further, although FIG. 2D is discussed with reference to model component 140, embodiments are not limited in this manner and one or more operations may be performed by other components and circuitry of the text editor system 105.

Figure 2E:
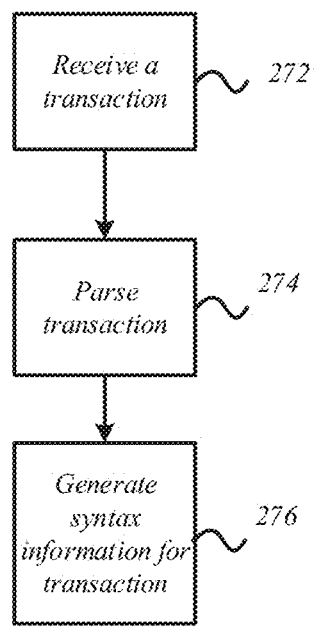
FIG. 2E illustrates an example embodiment of a fifth logic flow for processing by a text editor system.

With reference back to FIG. 1B, the text editor system 105 also includes a parser component 135 which may generate and provide syntax information. FIG. 2E illustrates one possible logic flow 270 that may occur while processing information by the parser component 135. Reference is now made to FIG. 2E. At block 272, the parser component 135 may receive a transaction from a component of the text editor system 105, such as the editing core component 130 and the model component 140. As mentioned, the transaction may include one or more tokens based on a received event sequence. At block 274, the parser component 135 may parse the transaction, e.g. break the transaction down into individual tokens. Further and at block 276, the parser component 135 may generate syntax information for the transaction. The syntax information, may include structure and ordering of tokens for the transaction. The syntax information may be used to perform syntax highlighting and code folding, for example. The syntax information may be provided to one or more other components of the text editor system 105. Embodiments are not limited in this manner.

Although FIG. 2E illustrates certain blocks occurring in a particular order, various embodiments are not limited in this manner. For example, one or more blocks may occur in parallel or simultaneously. In another example, one or more blocks may occur before or after other blocks and may be in a different order. In addition, the blocks are not dependent upon one another. Further, although FIG. 2E is discussed with reference to parser component 135, embodiments are not limited in this manner and one or more operations may be performed by other components and circuitry of the text editor system 105.

With reference back to FIG. 1B, the text editor system 105 also includes renderer component 145 which may render the event receiving layer 110 and the effects layer 120. The renderer component 145 may also determine parameters based on a result for the rendering the event receiving layer 110. The parameters can include token width values, token offset values, line height values, and line top values. In some embodiments, the renderer component 145 may utilize the nodes 170 to determine one or more parameters. The renderer component 145 may also align the event receiving layer 110 and the effects layer 120 based on the parameters for the tokens and present the layers 110 and 120 on a display.

Figure 2F:
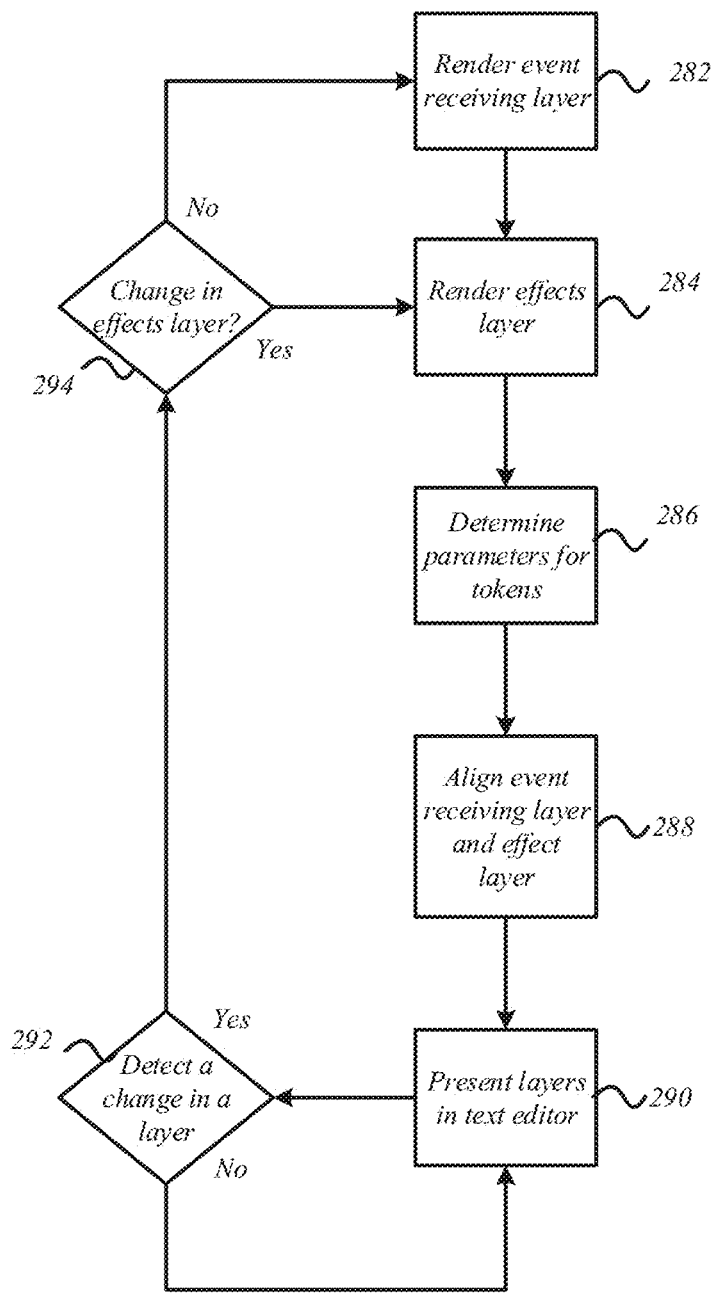
FIG. 2F illustrates an example embodiment of a fifth logic flow for processing by a text editor system.

FIG. 2F illustrates one possible logic flow 280 that may occur while processing information by the renderer component 145. Reference is now made to FIG. 2F. At block 282, the renderer component 145 may render the event receiving layer 110 for the text editor system 105. In some embodiments, the renderer component 145 may only render a portion of the event receiving layer 110 to be presented in a viewable area of a web browser on a display. The portion may be determined based on information received from the web browser, such as a size (width and height) of a viewable area. In some embodiments, the renderer component 145 may render or generate the event receiving layer 110 as a transparent or semi-transparent layer with the textarea tag to allow a user to interact with the event receiving layer 110 while not be visible present to the user. The event receiving layer 110 may be capable of receiving keyboard inputs, mouse inputs, and so forth. Embodiments are not limited in this manner.

At block 284, the renderer component 145 may render the effects layer 120 for the text editor system 105. More specifically, the renderer component 145 may generate the effects layer 120 including one or more tokens. In some instances, only a viewable area of the effects layer 120 may be rendered to reduce processing cycles and memory usage. As discussed above, the viewable area may be based on information received from a web browser to present the text editor and layers.

In some embodiments, the effects layer 120 may be rendered based on one or more settings for features and effects. These features may include supporting multiple languages, syntax highlighting, code folding, a focus line feature, block marks, search results, a cursor, a block selection, a focus line bar, auto completion, and so forth. Additional features include accessibility features include screen reader functionality, a zooming feature or window magnifier, a theme manager, a shortcut manager, and so on. The renderer component 145 applies these features and effects when rendering the effects layer 120.

In some instances, the renderer component 145 may utilize cached values when rendering the effects layer 120 including the one more tokens. The cached values may be stored in cache 180 and may include a token width value for each token, a token offset value for each token, a line height value for each line of tokens, and a line top value for each line tokens. The token width value may indicate a number of pixels wide for a token, the token offset value may indicate a horizontal position for a token, the line height value may indicate a line height for a line of tokens, and the line top value may indicate a distance to a top of the effects layer 120 for a line of tokens. These values may have been determined and cached during a previous rendering of the effects layer 120. These cached values may be used to render unchanged portions of the effects layer 120 to reduce processing cycles and memory usage.

At block 286, the renderer component 145 may determine one or more parameters based on the rendering results of the event receiving layer 110. In some embodiments, the renderer component 145 may use a node 170 to determine a parameter. Each node may be a XML DOM node that is capable of determine a particular parameter. The nodes 170 may be "buddy nodes" to assist in the calculation of parameters. These nodes 170 may be hidden in the DOM tree of the text editor system 105 such that they cannot be seen by users. In some embodiments, the first node 170-1 may be used to calculate the Y (height) coordinate of tokens for positioning in the effects layer 120 based on a special string when the content is less than one page in height in the event receiving layer 110. A second node 170-2 node may be used to measure the length of a specified string of text in the event receiving layer 110 to present tokens in the effects layer 120. A third node 170-3 may be used to assist in rendering a line number bar. As will be discussed in more detail below, other nodes 170 are used to calculate a token width value for each token, a token offset value for each token, a line height value for each line of tokens, and a line top value for each line tokens.

The renderer component 145 may use a node 170-$n$ (where n may be an positive integer) to determine a line height value for each line of the one or more tokens in the event receiving layer 110. In some embodiments, the node 170-$n$ may be an adjustable node and assigned one or more lines of tokens as a cluster of tokens in the event receiving layer 110. The renderer component 145 can calculate the total line height value for the cluster of tokens. For example, the renderer component 145 may cluster four lines of tokens to form the cluster of tokens, each line may include one or more tokens, and assign the cluster of tokens to the node 170-$n$. The renderer component 145 may render the cluster of tokens to determine a total height for the cluster of tokens as the height of the node 170-$n$. Note that the rendered cluster of tokens is not presented on a display or visible to a user. In some embodiments, the total height may be a total number of pixels high for the cluster of tokens. However, embodiments are not limited in this manner. The rendering component 145 may determine a line height value for each of the one or more lines of tokens based on the total height for the cluster divided by a number of lines of tokens forming the cluster of tokens in the event receiving layer 110. Embodiments are not limited to this example.

In another example, the renderer component 145 may determine a width of one or more tokens in the event receiving layer 110 for the effects layer 120. For example, the renderer component 145 may determine a width of a single token representing a letter, number, symbol, etc. In another example, the renderer component 145 may determine the width of a plurality of tokens representing a word, a few words, a variable, a number of symbols and so forth. To determine the width of one or more tokens, the renderer component 145 may assign the one or more tokens rendered in the event receiving layer 110 to a node 170-$n$ that is capable of adjusting its width. More specifically, the width of the node 170-$n$ may be adjusted to fit the one or more tokens and the renderer component 145 may use the width of the node 170-$n$ as the width of the one or more tokens, depending on whether the width is for a single token or a plurality of tokens. If the width is for a plurality of tokens, the width may be divided by the number of tokens in the plurality of tokens to determine a single token width. The width may be measured in a number of pixels. However, embodiments are not limited in this manner.

The renderer component 145 may also determine a token offset value in the horizontal direction (x) for each token in the event receiving layer 110 for the effects layer 120 utilizing the same or different node 170-n used to determine the width of a token. The token offset value may be a horizontal position of a token in a line of tokens, for example. The renderer component 145 may determine the token offset value of a token based on a number of pixels from an edge of the event receiving layer 110, for example. In some instances, the left edge of the event receiving layer 110 may be used, but embodiments are not limited in this manner. In one example, the token offset value may indicate a number of pixels from the edge to the first pixel of the specific token.

In another example, the renderer component 145 may use a node 170-n to determine a line top value for each line tokens in the event receiving layer 110 for use in determining positions in the effects layer 120. More specifically, the renderer component 145 may use the node 170-n to determine a line top value for a middle line of tokens positioned in the rendered event receiving layer 110. The line top value may be number of pixels to an edge of the event receiving layer 110, such as the top edge. However, in the same or other embodiments, the bottom edge may be used. The renderer component 145 can also determine line top values for one or more other lines of tokens based on the line top value for the middle line of tokens. The top values for each of the one or more lines not positioned in the middle line will be calculated from the position of the middle line of tokens, for example. The middle line of tokens top position will be cached in cache 180 and continued to be used during future renderings. In some embodiments, each of the one or more parameters may be cached in the cache 180 to render or re-render one or more of the event receiving layer 110 and/or the effects layer 120. The determined parameters based on the rendered event receiving layer 110 may be used to determine position of tokens in the effects layer 120 to align the event receiving layer 110 and the effects layer 120.

More specifically and at block 288, the renderer component 145 may align the event receiving layer 110 and the effects layer 120 using the one or more determined parameters to determine position of tokens in the effects layer 120. More specifically, the renderer component 145 may use the token width value(s) for each token, a token offset value(s) for each token, a line height value(s) for each line of tokens, and a line top value for each line tokens to align the two layers, to determine positions of tokens or position of lines of tokens in the effects layer 120. In some embodiments, the one or more parameters may have been previously calculated at block 286, as previously discussed. However, in other instances, one or more parameters may be cached values retrieved from cache 180 by the renderer component 145. The precise calculations of the parameters of the tokens may allow the renderer component 145 to align the event receiving layer 110 over top of the effects layer 120 (or effects layer 120 under the receiving layer 110) to ensure that a shadow effect or misaligned cursor is not present when the two layers are presented on a display. The positions may be character coordinate positions in the horizontal (x) direction and vertical (y) direction in pixels within the layer from a common point of reference, such as an edge or corner of one of the layers. However, embodiments are not limited in this manner and the parameter(s) may be used to determine a position for the effects layer 120 itself in x and y coordinates within a web browser.

In some embodiments, the renderer component 145 may align the layers by determining the parameters and using the parameters to determine positions of effects presented in the effects layer 120 for the tokens for presentation. For example, the renderer component 145 may use the token width value(s) for each token, a token offset value(s) for each token, a line height value(s) for each line of tokens, and a line top value for each line tokens and one or more settings to determine where to accurately position of the effects of the effects layer 120 The positions may include x and y coordinates (in pixels) to place an edge or a particular pixel of each token in the effects layer 120.

At block 290, the event receiving layer 110 and the effects layer 120 may be presented on a display to a user. The layers may continue to be presented on the display until one or more changes are detected on at least one of the layers at decision block 292. For example, the renderer component 145 may determine that one or more events were received by the event receiving layer 110. In another example, the renderer component 145 may determine that a user changed one or more effects to present the one or more tokens in a particular manner on the display in the effects layer 120. Embodiments are not limited in this manner.

At block 294, the renderer component 145 may determine that a change occurred in the effects layer 120 and preform a rendering or a re-rendering of the effects layer 120 at block 284. In some instances, cached values may be used to re-render at least a portion of the effects layer 120. If the effects layer 120 has not been changed, the renderer component 145 may determine that a change occurred to the event receiving layer 110 and cause the event receiving layer 110 to be re-rendered using cached values, for example. Embodiments are not limited in this manner.

Although FIG. 2F illustrates certain blocks occurring in a particular order, various embodiments are not limited in this manner. For example, one or more blocks may occur in parallel or simultaneously. In another example, one or more blocks may occur before or after other blocks and may be in a different order. In addition, the blocks are not dependent upon one another. Further, although FIG. 2F is discussed with reference to renderer component 145, embodiments are not limited in this manner and one or more operations may be performed by other components and circuitry of the text editor system 105.

Figure 3A:
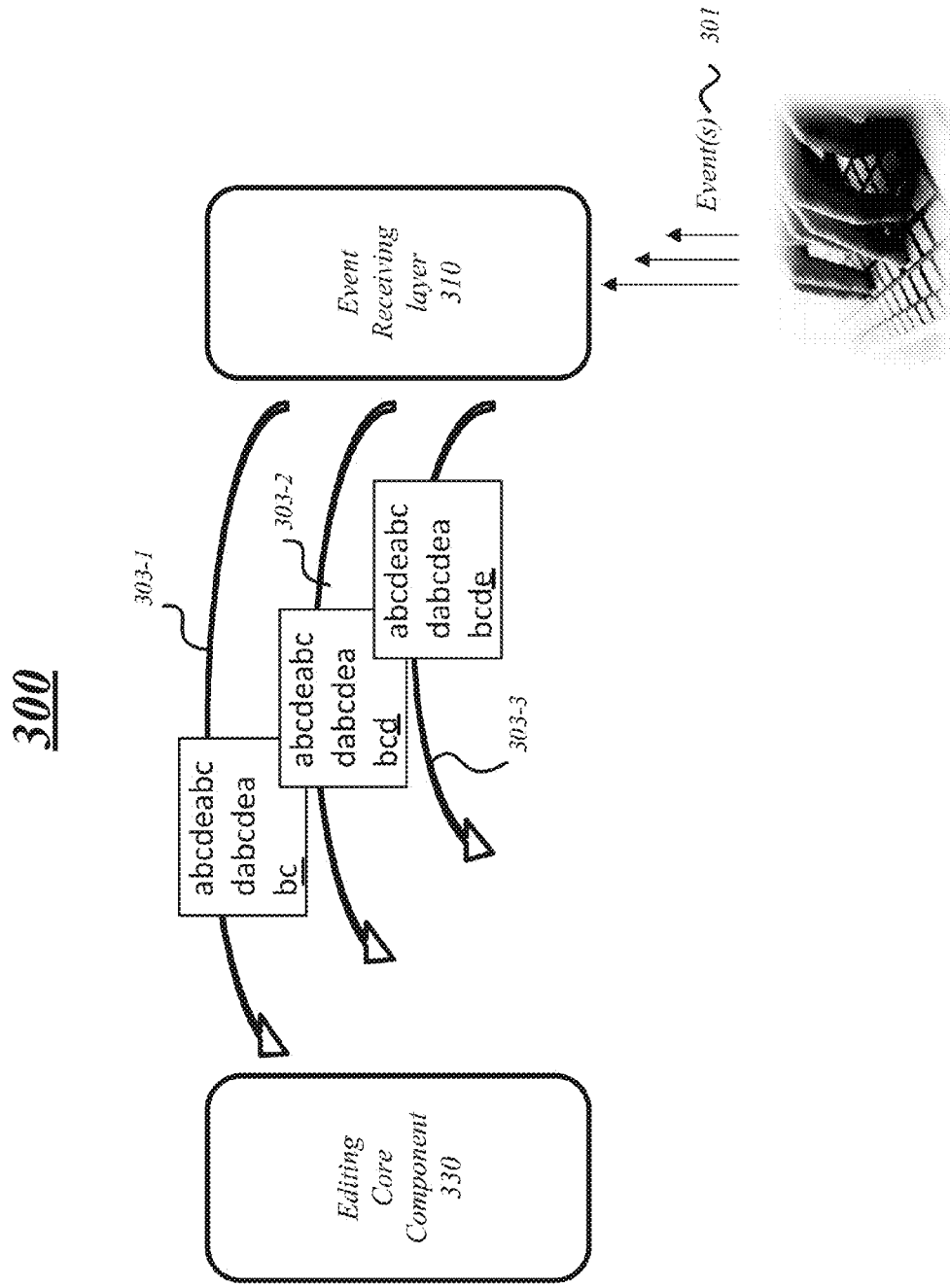
FIGS. 3A/3B illustrate an example of a first processing flow to process one or more inputs.
Figure 3B:
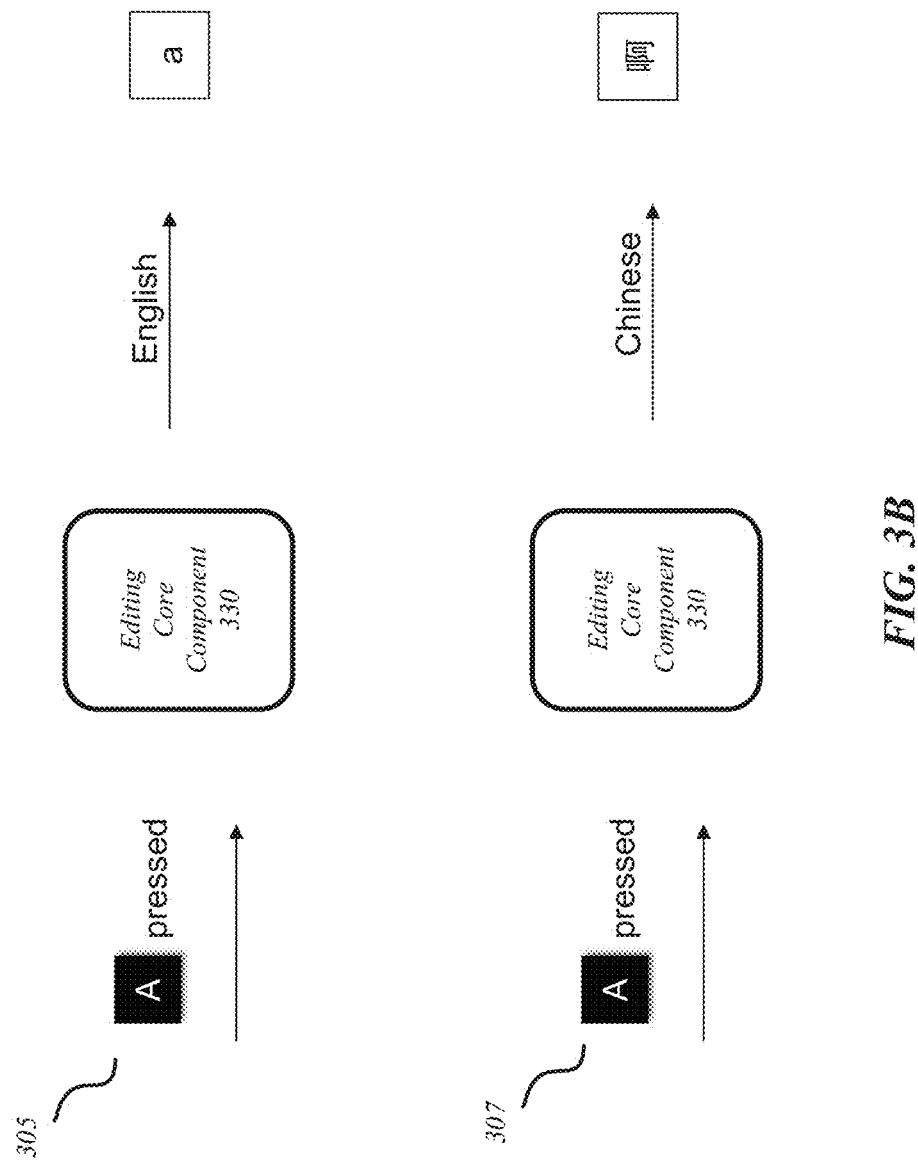

FIGS. 3A/3B illustrate an example compute system 300 for handling one or more events. Although FIGS. 3A and 3B illustrate a limited number of components, embodiments are not limited this manner and the components may be part of a text editor system 105, as previously discussed. In FIG. 3A, one or more events 301 may be received by an events receiving layer 310, which may be the same as events receiving layer 110 previously discussed above. In the illustrated example, each event 301 may be a keyboard input entered via a user using a keyboard. However, in some embodiments, when a user presses a key a number of events may be generated in an event sequence for the single key press. Embodiments are not limited in this manner.

The event receiving layer 310 may be a transparent layer utilizing the textarea tag and presented to a user on a display. Although the event receiving layer 310 may be transparent, a user may be able to see and/or determine the location of a cursor to enter an event, such as a keyboard input. The event receiving layer 310 may receive the event or event sequence and communicate the event to the editing core component 330 for further processing.

In the illustrated example, each event can be sent to the editing core component 330 in an event sequence 303. For example, the event receiving layer 310 may receive a first letter "c" as part of an event sequence 303-1, a second letter "d" as part of the event sequence 303-2, and a third letter "e" as part of the event sequence 303-3. The event sequence may include any number of letters, numbers, symbols, and so forth, as previously discussed. In some embodiments, the event sequence may include one or more instructions based on the user input, for example. The event sequence 303 may be processed by the editing core component 330.

In some embodiments, the editing core component 330 may determine a specific letter or symbol based on a received event, event sequence, and information received from the web browser, as illustrated in FIG. 3B. More specifically, the editing core component 330 may determine that the web browser is to present one or more tokens in a specific language, such as English, Chinese or another language, based on location information received for the web-browser. The location information may include coordinates of the user's device, an IP address of the user's device, city/country information of the user's device, and so forth. As illustrated in processing flow 305, the editing core component 330 may receive an event and information that indicates the letter "A" is to be presented as the English letter "A". However, as illustrated in processing flow 307, the editing core component 330 may receive an event, event sequence, and information indicating the letter "A" is to be presented as the Chinese symbol "C". Embodiments are not limited in this manner.

Figure 4A:
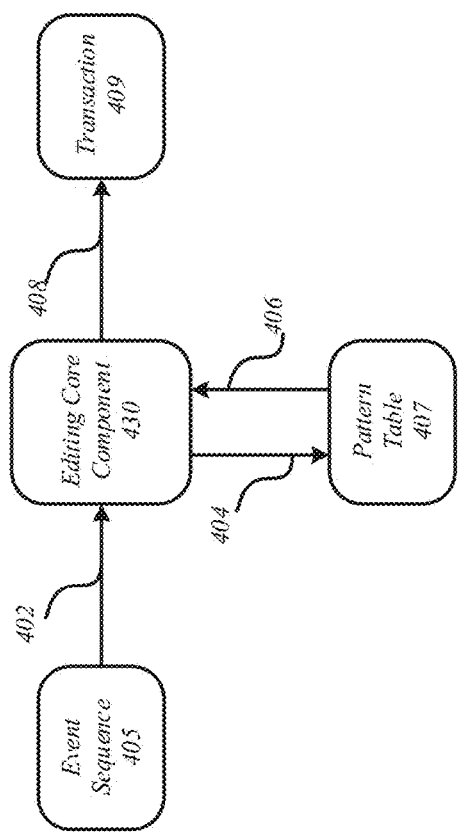
FIGS. 4A/4B illustrate an example of a second processing flow to process one or more event sequences.

FIGS. 4A/4B illustrate an example processing flow 400 for processing an event and event sequence by the editing core component 430. More specifically, FIG. 4A illustrates an editing core component 430 receiving an event sequence 405 at line 402. The event sequence 405 may include one or more events based on a user interaction with a keyboard or mouse, for example. The event sequence 405 may be based on the web browser presenting the text editor system and layers. More specifically, different web browsers may create different event sequences 405 for the same input. FIG. 3A illustrates one possible example of an event sequence 303 including a number of events 301. As previous discussed, the events may be interpreted by the editing core component 430 based on a determined language for the text editor system 105. However and as previously mentioned, an event sequence may include information other than specific letters or symbols for presentation.

Figure 4B:
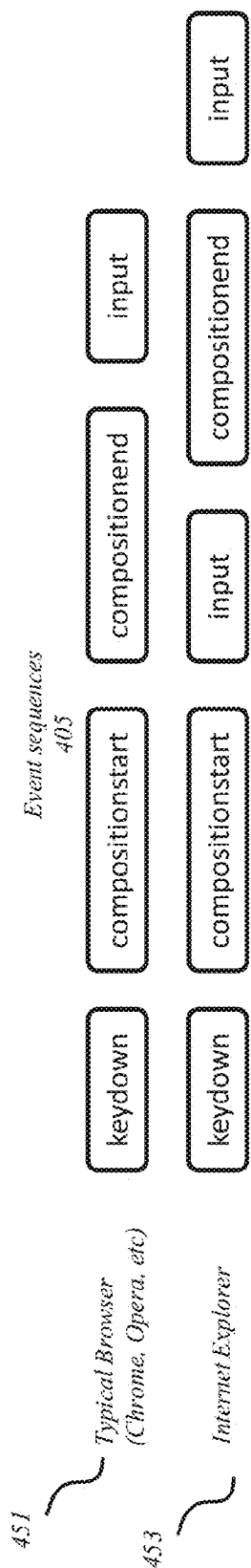

FIG. 4B illustrates one possible example of web browsers generating different event sequences 405 for the same input based on the type of web browser for one or more events. The event sequence 405 for a composition input handled by a typical browser 451 such as Chrome®, Opera®, or Firefox® may be "keydown" "compositionstart" "compositionend" and "input". While the event sequence 405 for the same event may be "keydown" "compisitionstart" "input" "compositionend" "input" when Internet Explorer® 453 is used. The editing core component 430 may determine which web browser is being used for the text editor system 105 and base the pattern recognition operation on the web browser.

With reference back to FIG. 4A, at line 404, the editing core component 430 may perform pattern recognition by performing a lookup in a pattern table 407 (or other data structure) based on the received event sequence 405 and the web browser being used to generate the event sequence 405.

In some embodiments, the editing core component 430 may generate a hash value for the event sequence and compare the generated hash value with stored hash values to perform pattern recognition. In some embodiments, the comparison may performed based on the web browser be used. As previous mentioned, different web browsers may generate different event sequences for the same events. Thus, different hash values will be generated based on the web browser and the different event sequence. To perform the pattern recognition, the editing core component 430 may perform a hash lookup in a particular database associated with a particular web browser. For example, the editing core component 430 may perform a lookup in a database associated with a Chrome® web browser for an event sequence to determine a transaction if Chrome® is being used. To determine the same transaction, the editing core component 430 may perform a lookup in a database associated with Internet Explorer® web browser if Internet Explorer® is being used. Embodiments are not limited in this manner.

At line 406 the editing core component 430 may receive information from the pattern table 407 indicating a specific transaction including one or more tokens for the event sequence 405. The transaction 409 may be communicated to one or more other components of the text editor system for further processing including presenting in an effects layer at line 408. This process may be repeated any number of times for each event sequence generated by the event receiving layer.

Figure 5A:
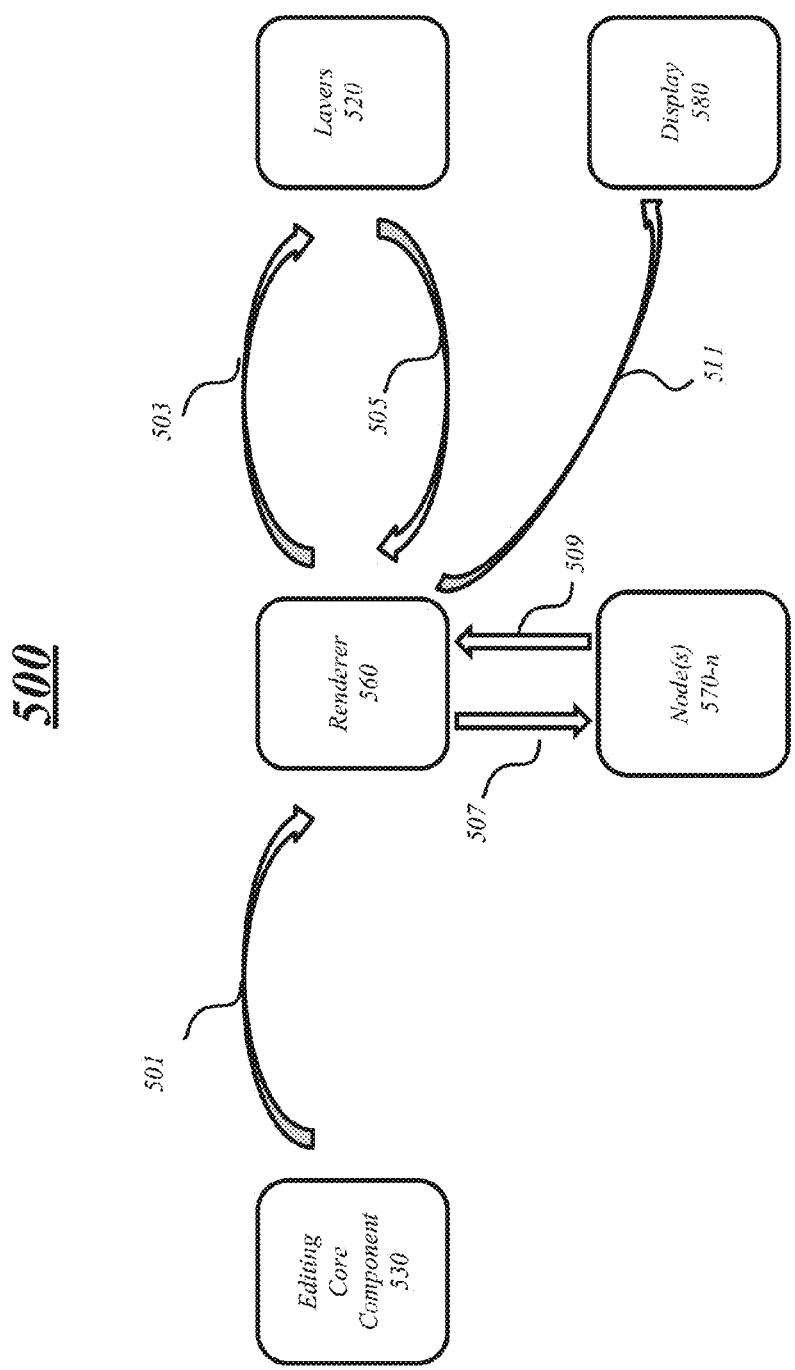
FIGS. 5A/5B illustrate an example of a third processing flow to process one or more transactions for presentation on a display.

FIGS. 5A/5B illustrate an example processing flow 500 to process one or more transactions by a renderer component 560, such as a transaction determined by the editing core component. At line 501, the renderer component 560 may receive a transaction from the editing core component 530. The transaction may include one or more tokens for presentation on a display. In some embodiments, the transaction may be determined by the editing core component 530 by performing a lookup, as previously discussed.

The renderer component 560 may receiving the transaction and render the layers 520 including the event receiving layer and the effects layer at line 503. At line 505, the renderer component 560 may determine the results of rendering the layers 520. The results may include information such that the renderer component 560 can determine parameters, such as one or more of the parameters discussed above in FIGS. 1B and 2F. The renderer component 560 may utilize one or more nodes 570-$n$ at lines 507 and 509 to determine parameters. Each node may be a XML DOM node that is capable of determine a particular parameter. These nodes 570 may be hidden in the DOM tree of the text editor system, so they cannot be seen by users.

The renderer component 560 may use a node 570 to determine a line height value for each line of the one or more tokens. In some embodiments, the node 570 may be an adjustable node and assigned one or more lines of tokens as a cluster of tokens. The renderer component 560 can calculate the total line height value for the cluster of tokens. The renderer component 560 may render the cluster of tokens to determine a total height for the cluster of tokens as the height of the adjustable node. Note that the rendered cluster of tokens is not presented on a display or visible to a user. In some embodiments, the total height may be a total number of pixels high for the cluster of tokens. However, embodiments are not limited in this manner. The rendering component 560 may determine a line height value for each of the one or more lines of tokens based on the total height for the cluster divided by a number of lines of tokens forming the cluster of tokens. Embodiments are not limited to this example.

In another example, the renderer component 560 may determine a width of one or more tokens. For example, the renderer component 560 may determine a width of a single token representing a letter, number, symbol, etc. In another example, the renderer component 560 may determine the width of a plurality of tokens representing a word, a few words, a variable, a number of symbols and so forth. To determine the width of one or more tokens, the renderer component 560 may assign the one or more tokens to a node 570 that is capable of adjusting its width. More specifically, the width of node 570 may be adjusted to fit the one or more tokens and the renderer component 560 may use the width of the node 570 as the width of the one or more tokens. The width may be measured in a number of pixels. However, embodiments are not limited in this manner.

The renderer component 560 may also determine a token offset value for each token utilizing the same or different node 570 used to determine the width of a token. The token offset value may be a horizontal position of a token in a line of tokens, for example. The renderer component 560 may determine the token offset value in the horizontal direction of a token based on a number of pixels from an edge of the event receiving layer, for example. In some instances, the left edge of the event receiving layer may be used, but embodiments are not limited in this manner. In one example, the token offset value may indicate a number of pixels from the edge to the first pixel of the specific token.

In another example, the renderer component 560 may use a node 570 to determine a line top value for each line tokens. More specifically, the renderer component 560 may use the node 570 to determine a line top value for a middle line of tokens positioned in the rendered event receiving layer. The renderer component 560 can determine line top values for one or more other lines of tokens positioned in the rendered events receiving layer based on the line top value for the middle line of tokens. The top values for each of the one or more lines not positioned in the middle line will be calculated from the position of the middle line of tokens, for example. In some embodiments, each of the one or more parameters previously discussed, may be used to determine and/or as positions for tokens to present in the effects layer such that they event receiving layer and the effects align. The parameters may also be cached in a cache to render or re-render one or more of the event receiving layer and/or the effects layer.

At line 511, the renderer component 560 may send one or more layers to the display 580 for presentation. For example, the renderer component 560 may send the event receiving layer and the effects layer to the display 580 for presentation. Further, the renderer component 560 may use the one or more parameters discussed above to align the event receiving layer and the effects layer on the display 580.

Figure 5B:
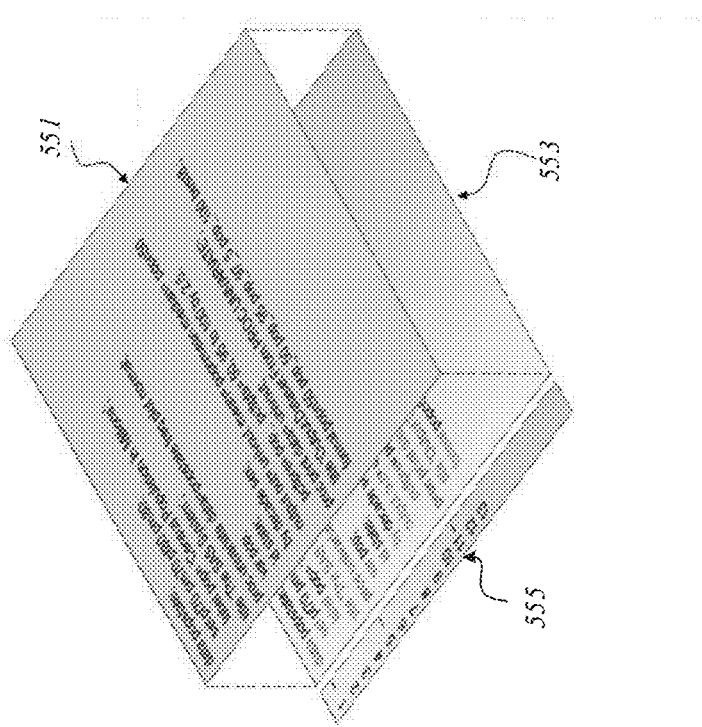

As illustrated in FIG. 5B, the event receiving layer 551 must be precisely aligned with the effects layer 553. The renderer component 560 may utilize the determined parameters to perform the precise alignment of the layers 551 and 553. For example, the one or more parameters may be determined for tokens presented, but no visible, in the event receiving layer 551 and used to determine positions of tokens in the effects layer 553 such that the two layers align. The renderer component 560 may also present one or more line numbers 555 with the layers 551 and 553. In some embodiments, the line numbers 555 may be presented with the effects layer 553. Embodiments are not limited in this manner.

Figure 6:
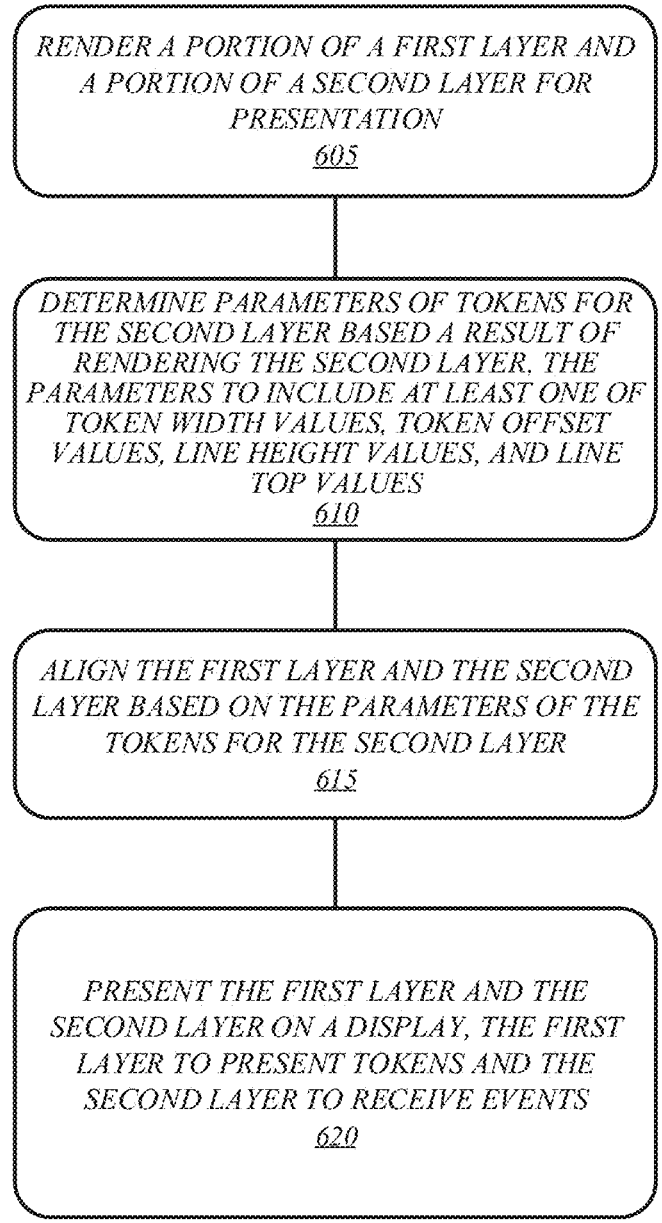
FIG. 6 illustrates an example of a sixth logic flow.

FIG. 6 illustrates an example of a six logic flow diagram 600. The logic flow 600 may be representative of some or all of the operations executed by one or more embodiments described herein. For example, the logic flow 600 may illustrate operations performed by the text editor system 105, as discussed in FIGS. 1A-5B. In the illustrated embodiment shown in FIG. 6, the logic flow 600 may include rendering a portion of a first layer and a portion of a second layer for presentation at block 605. In some instances, the portion rendered may be in a viewable area to be presented in a web browser. The portions may also be based on one or more changes that occur on the first and/or second layer. For example, only a portion where a change has occurred will be rendered or re-rendered. In some embodiments, the first layer may be an effects layer and the second layer may be an event receiving layer.

At block 610, the logic flow 600 may include determining parameters of tokens for the second layer based a result of rendering the second layer, the parameters to include at least one of token width values, token offset values, line height values, and line top values at block 610. Further, the logic flow 600 may include aligning the first layer and the second layer based on the parameters of the tokens for the second layer at block 615. For example, the parameters may be used to precisely align the layers to avoid presenting the layers with shadows or other artifacts. Moreover, the parameters determined for the second layer may be used to determine positions of tokens in the first layer and/or a position of the first layer itself within a web browser. At block 620, the logic flow may include presenting the first layer and the second layer on a display, the first layer to present tokens and the second layer to receive events.

Figure 7:
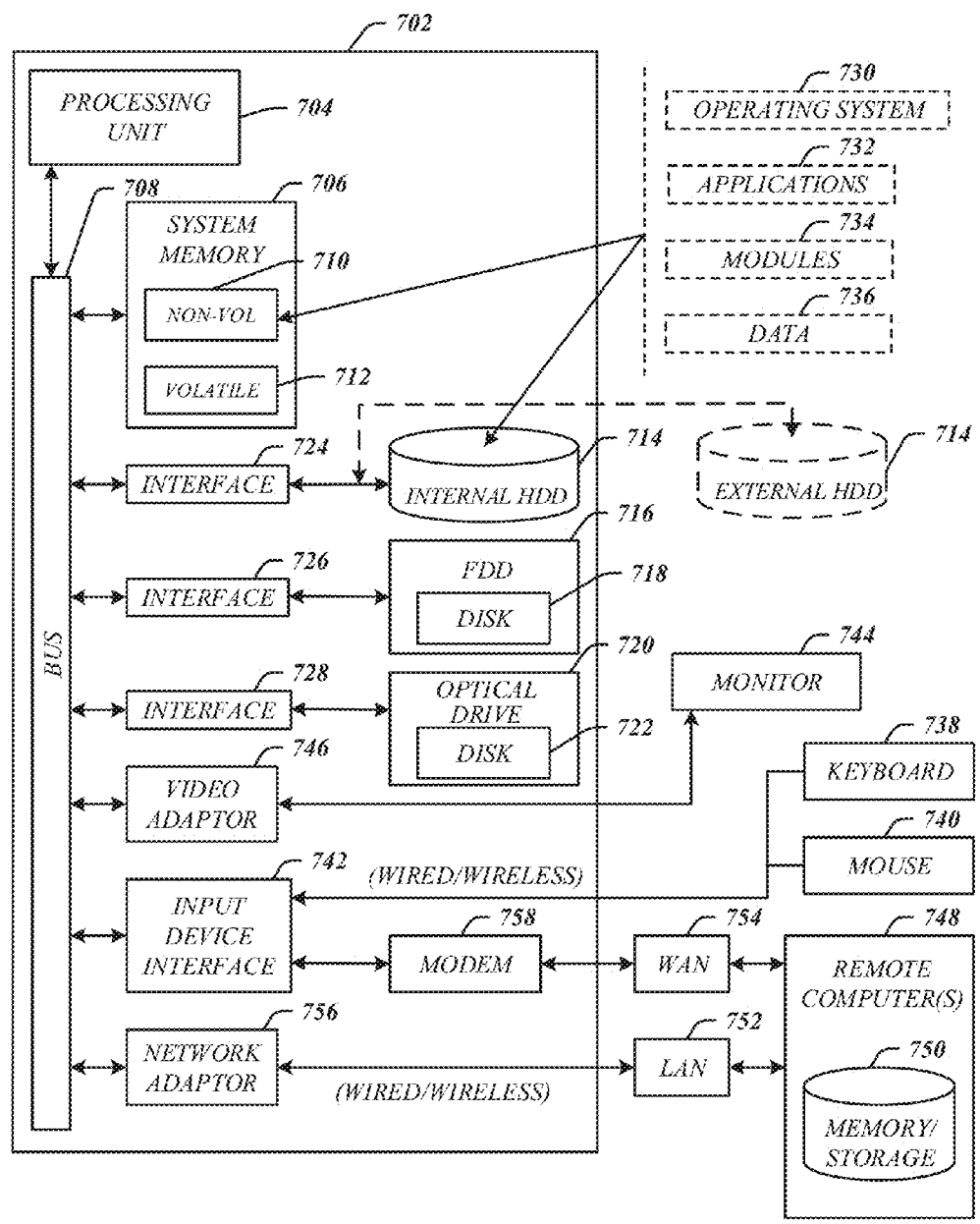
FIG. 7 illustrates an example of a first computer architecture.

FIG. 7 illustrates an embodiment of an exemplary computing architecture 700 suitable for implementing various embodiments as previously described. In one embodiment, the computing architecture 700 may include or be implemented as part the text editor system 105, for example.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100 and text editor system 105.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 702 family of standards, such as wireless devices operatively disposed in wireless communication (e.g., IEEE 702.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 702.11x (a, b, g, n, etc.) to provide secure, reliable, fast wireless connectivity. A Wi-Fi network can be used to connect computers to each other, to the Internet, and to wire networks (which use IEEE 702.3-related media and functions).

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

What is claimed is:

1. An apparatus, comprising:
processing circuitry; and
logic, at least partially implemented by the processing circuitry, the logic to:
render a portion of a first display layer and a portion of a second display layer for presentation on a display;
determine parameters of tokens for the second display layer based on a result of rendering the second display layer, the parameters to include at least one of token width values, token offset values, line height values, and line top values;
align one or more tokens of the first display layer with corresponding one or more tokens of the second display layer for presentation on the display based on the parameters for the tokens for the second display layer; and
present the first display layer and the second display layer aligned on the display, the first display layer visibly presented on the display to present the one or more tokens of the first display layer with one or more effects and the second display layer transparently presented on the display to receive events, the second display layer to receive one or more events associated with the one or more tokens of the second display layer and the one or more tokens of the first display layer, and the first display layer to present the one or more tokens with one or more effects through the second display layer and aligned with the one or more tokens of the second display layer based on the one or more events received by the second display layer.

2. The apparatus of claim 1, the logic to determine a viewable area for the presentation of the first and second display layers on the display and render the portion of the first display layer and the portion of the second display layer located within the viewable area.

3. The apparatus of claim 1, the logic to cache at least one of a token width value for each token, a token offset value for each token, a line height value for each line of tokens, and a line top value for each line tokens as cached values and use at least one of the cached values to re-render a portion of the first display layer or the second display layer for presentation.

4. The apparatus of claim 3, the token width value to indicate a number of pixels wide for a token, the token offset value to indicate a horizontal position for a token, the line height value to indicate a line height for a line of tokens, and the line top value to indicate a distance to a top of the second display layer for a line of tokens.

5. The apparatus of claim 1, the logic to determine line height values comprising:
cluster one or more lines of tokens to form a cluster of tokens;
determine a total height for the cluster of tokens in the second display layer based on the result of rendering the second display layer, and
determine a line height value for each of the one or more lines of tokens based on a total height divided by a number of lines of tokens forming the cluster of tokens.

6. The apparatus of claim 1, the logic to determine line top values comprising:
determine a line top value for a middle line of tokens positioned in the result of rendering the second display layer;
determine line top values for one or more other lines of tokens positioned in the result of rendering the second display layer based on the line top value for the middle line of tokens.

7. The apparatus of claim 1, the logic to:
determine positions of the one or more tokens for the first display layer based on the parameters for the second display layer,
place the one or more tokens in the first display layer based on the positions, and
apply one or more effects to the one or more tokens for the first display layer for presentation.

8. The apparatus of claim 1, the events comprising one or more of a mouse movement, button down, button up, a key down, and a key up, and the tokens comprising one or more of a symbol, a character, a number, and a letter.

9. The apparatus of claim 1, comprising:
a memory to store a pattern recognition table comprising patterns of events; and
the logic to receive an event sequence comprising one or more events, determine a hash value for the event sequence, and determine a transaction based on the hash value for the event sequence matching a pattern stored in the pattern recognition table.

10. The apparatus of claim 9, the logic to detect one or more sequence intersecting events in the event sequence and exclude the one or more sequence intersecting events for determining the hash value.

11. The apparatus of claim 9, the logic to use a pattern stored in the pattern recognition table to determine the transaction based on a web browser to present a text editor.

12. A computer-implemented method, comprising:
rendering a portion of a first display layer and a portion of a second display layer for presentation on a display;
determining parameters of tokens for the second display layer based on a result of rendering the second display layer, the parameters to include at least one of token width values, token offset values, line height values, and line top values;
aligning one or more tokens of the first display layer with corresponding one or more tokens of the second display layer for presentation on the display based on the parameters for the tokens for the second display layer; and presenting the first display layer and the second display layer aligned on the display, the first display layer visibly presented on the display to present the one or more tokens of the first display layer with one or more effects and the second display layer transparently presented on the display to receive events, the second display layer to receive one or more events associated with the one or more tokens of the second display layer and the one or more tokens of the first display layer, and the first display layer to present the one or more tokens with one or more effects through the second display layer and aligned with the one or more tokens of the second display layer based on the one or more events received by the second display layer.

13. The computer-implemented method of claim 12, comprising determining a viewable area for the presentation of the first and second display layers on the display, and rendering the portion of the first display layer and the portion of the second display layer located within the viewable area.

14. The computer-implemented method of claim 12, comprising caching at least one of a token width value for each token, a token offset value for each token, a line height value for each line of tokens, and a line top value for each line tokens as cached values, and using at least one of the cached values to re-render a portion of first display layer or the second display layer for presentation.

15. The computer-implemented method of claim 14, the token width value to indicate a number of pixels wide for a token, the token offset value to indicate a horizontal position for a token, the line height value to indicate a line height for a line of tokens, and the line top value to indicate a distance to a top of the second display layer for a line of tokens.

16. The computer-implemented method of claim 12, comprising determining line height values comprising:
clustering one or more lines of tokens to form a cluster of tokens;
determining a total height for the cluster of tokens in the second display layer based on the result of rendering the second display layer; and
determining a line height value for each of the one or more lines of tokens based on a total height divided by a number of lines of tokens forming the cluster of tokens.

17. The computer-implemented method of claim 12, comprising determining line top values comprising:
determining a line top value for a middle line of tokens positioned in the result of rendering the second display layer; and
determining line top values for one or more other lines of tokens positioned in the result rendering of the second display layer based on the line top value for the middle line of tokens.

18. The computer-implemented method of claim 12, comprising:
determining positions of the one or more tokens for the first display layer based on the parameters for the second display layer;
placing the one or more tokens in the first display layer based on the positions; and
applying one or more effects to the one or more tokens for the first display layer for presentation.

19. The computer-implemented method of claim 12, the events comprising one or more of a mouse movement, button down, button up, a key down, and a key up, and the tokens comprising one or more of a symbol, a character, a number, and a letter.

20. The computer-implemented method of claim 12,
storing, in memory, a pattern recognition table comprising patterns of events; and
receiving an event sequence comprising one or more events;
determining a hash value for the event sequence; and
determining a transaction based on the hash value for the event sequence matching a pattern stored in the pattern recognition table.

21. The computer-implemented method of claim 20, comprising detecting one or more sequence intersecting events in the event sequence and excluding the one or more sequence intersecting events for determining the hash value.

22. The computer-implemented method of claim 20, comprising using a pattern stored in the pattern recognition table to determine the transaction based on a web browser to present a text editor.

23. At least one non-transitory computer-readable storage medium comprising instructions that when executed cause processing circuitry to:
render a portion of a first display layer and a portion of a second display layer for presentation on a display;
determine parameters of tokens for the second display layer based on a result of rendering the second display layer, the parameters to include at least one of token width values, token offset values, line height values, and line top values;
align one or more tokens of the first display layer with corresponding one or more tokens of the second display layer for presentation on the display based on the parameters for the tokens for the second display layer; and
present the first display layer and the second display layer aligned on the display, the first display layer visibly presented on the display to present the one or more tokens of the first display layer with one or more effects and the second display layer transparently presented on the display to receive events, the second display layer to receive one or more events associated with the one or more tokens of the second display layer and the one or more tokens of the first display layer, and the first display layer to present the one or more tokens with one or more effects through the second display layer and aligned with the one or more tokens of the second display layer based on the one or more events received by the second display layer.

24. The non-transitory computer-readable storage medium of claim 23, comprising instructions that when executed cause the processing circuitry to cache at least one of a token width value for each token, a token offset value for each token, a line height value for each line of tokens, and a line top value for each line tokens as cached values and use at least one of the cached values to re-render a portion of the first display layer or a portion the second display layer for presentation, the token width value to indicate a number of pixels wide for a token, the token offset value to indicate a horizontal position for a token, the line height value to indicate a line height for a line of tokens, and the line top value to indicate a distance to a top of the second display layer for a line of tokens.

25. The non-transitory computer-readable storage medium of claim 23, comprising instructions that when executed cause the processing circuitry to determine line height values comprising:

cluster one or more lines of tokens to form a cluster of tokens;
determine a total height for the cluster of tokens in the second display layer based on the result of rendering the second display layer; and
determine a line height value for each of the one or more lines of tokens based on a total height divided by a number of lines of tokens forming the cluster of tokens.

26. The non-transitory computer-readable storage medium of claim 23, comprising instructions that when executed cause the processing circuitry to determine line top values comprising:
determine a line top value for a middle line of tokens positioned in the result of rendering the second display layer; and
determine line top values for one or more other lines of tokens positioned in the result of rendering the second display layer based on the line top value for the middle line of tokens.

27. The non-transitory computer-readable storage medium of claim 23, comprising instructions that when executed cause the processing circuitry to:
determine positions of the one or more tokens for the first display layer based on the parameters for the second display layer;
place the one or more tokens in the first display layer based on the positions; and
apply one or more effects to the one or more tokens for the first display layer for presentation.

28. The non-transitory computer-readable storage medium of claim 23, comprising instructions that when executed cause the processing circuitry to store, in a memory, a pattern recognition table comprising patterns of events, receive an event sequence comprising one or more events, determine a hash value for the event sequence, and determine a transaction based on the hash value for the event sequence matching a pattern stored in the pattern recognition table.

29. The non-transitory computer-readable storage medium of claim 28, comprising instructions that when executed cause the processing circuitry to detect one or more sequence intersecting events in the event sequence and exclude the one or more sequence intersecting events for determining the hash value.

30. The non-transitory computer-readable storage medium of claim 28, comprising instructions that when executed cause the processing circuitry to use a pattern stored in the pattern recognition table to determine the transaction based on a web browser to present a text editor.

* * * * *